(12) United States Patent
Eriksson

(10) Patent No.: US 8,948,113 B2
(45) Date of Patent: Feb. 3, 2015

(54) DYNAMIC BUNDLING IN LTE USING EXPLICIT SIGNALLING

(75) Inventor: Erik Eriksson, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 298 days.

(21) Appl. No.: 13/640,006

(22) PCT Filed: Sep. 14, 2012

(86) PCT No.: PCT/SE2012/050976
§ 371 (c)(1),
(2), (4) Date: Oct. 8, 2012

(87) PCT Pub. No.: WO2013/147664
PCT Pub. Date: Oct. 3, 2013

(65) Prior Publication Data
US 2013/0250869 A1    Sep. 26, 2013

Related U.S. Application Data

(60) Provisional application No. 61/615,607, filed on Mar. 26, 2012.

(51) Int. Cl.
*H04W 52/48* (2009.01)
*H04L 1/18* (2006.01)

(52) U.S. Cl.
CPC ............. *H04W 52/48* (2013.01); *H04L 1/1864* (2013.01)
USPC ....................................... 370/329; 370/395.4

(58) Field of Classification Search
CPC ....... H04L 1/08; H04L 1/1822; H04L 1/1825; H04L 1/1864; H04L 1/1858; H04W 52/48; H04W 72/1278

USPC ......... 370/310, 315, 316, 326, 328, 329, 351, 370/389, 395.1, 395.4, 428, 464, 465, 468; 455/403, 422.1
See application file for complete search history.

(56) References Cited

U.S. PATENT DOCUMENTS

| | | | |
|---|---|---|---|
| 2005/0249120 A1* | 11/2005 | Heo et al. ...................... | 370/236 |
| 2010/0322177 A1* | 12/2010 | Luo et al. ...................... | 370/329 |
| 2011/0275396 A1* | 11/2011 | Nishio et al. .................. | 455/509 |
| 2012/0051305 A1* | 3/2012 | Wang et al. ................... | 370/329 |
| 2012/0230272 A1* | 9/2012 | Kim et al. ..................... | 370/329 |

OTHER PUBLICATIONS

3rd Generation Partnership Project. "Efficient Persistent UL Scheduling and HARQ Feedback Usage." 3GPP TSG RAN WG2 #58bis, R2-072667, Jun. 25-29, 2007, pp. 1-7, Orlando, USA.
(Continued)

*Primary Examiner* — Obaidul Huq
(74) *Attorney, Agent, or Firm* — Murphy Bilak & Homiller, PLLC

(57) ABSTRACT

The teachings herein disclose methods (600, 700) and apparatuses (36, 50) for dynamically rescheduling retransmissions from a selected Hybrid Automatic Repeat reQuest, "HARQ", process, based on temporarily remapping the selected HARQ process to one or more subframes (12) that are by default scheduled for another HARQ process running synchronously with the first HARQ process. One advantage of dynamic rescheduling is that a retransmission for a given HARQ process can be accelerated in time, as compared to when the retransmission would occur absent the remapping. In another advantageous aspect, in at least some embodiments, the control signalling (20) for dynamic rescheduling is included in the Downlink Control Information, "DCI", used to send scheduling grants for the HARQ processes, such that dynamic rescheduling uses control signalling (20) that is compatible with existing scheduling grant signalling.

26 Claims, 6 Drawing Sheets

(56) References Cited

OTHER PUBLICATIONS

3rd Generation Partnership Project. "Uplink synchronous HARQ and RACH." 3GPP TSG RAN WG2 #60bis, Tdoc R2-080222, Jan. 14-18, 2008, pp. 1-2, Sevilla, Spain.

3rd Generation Partnership Project. "Simulation for Multiple Patterns." 3GPP TSG RAN WG2 #63, R2-084262, Aug. 18-22, 2008, pp. 1-6, Jeju, Korea.

3rd Generation Partnership Project. "HARQ Process Usage for TII Bundling." 3GPP TSG-RAN2 Meeting #65, R2-091284, Feb. 9-13, 2008, pp. 1-4, Athens, Greece.

* cited by examiner

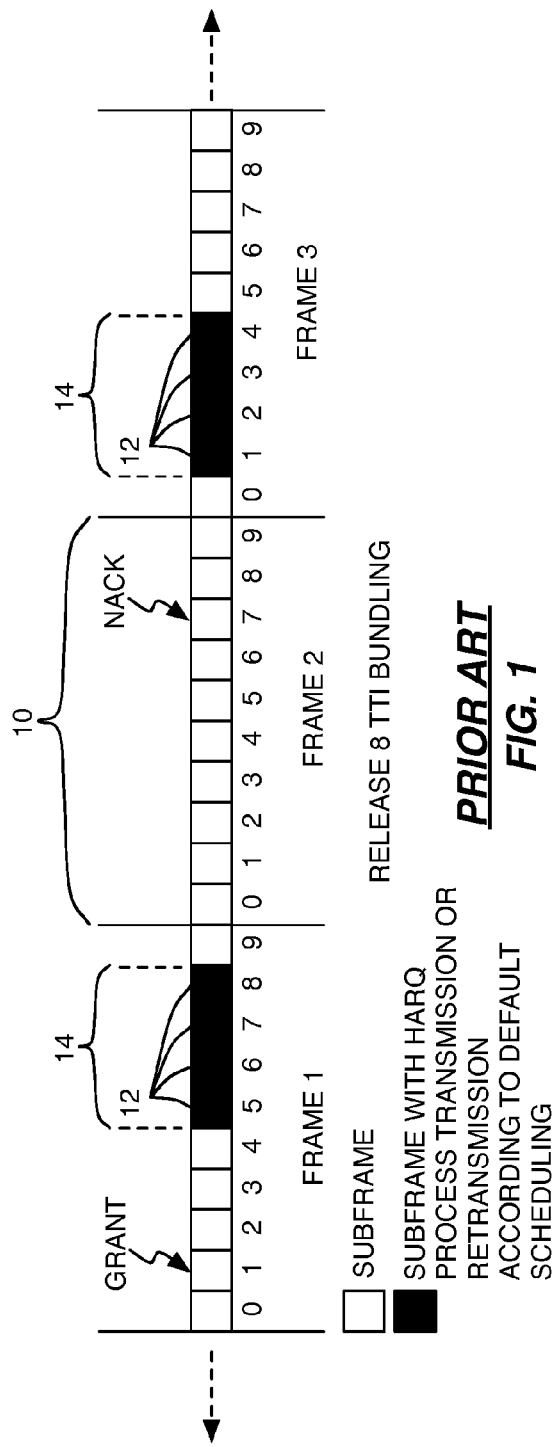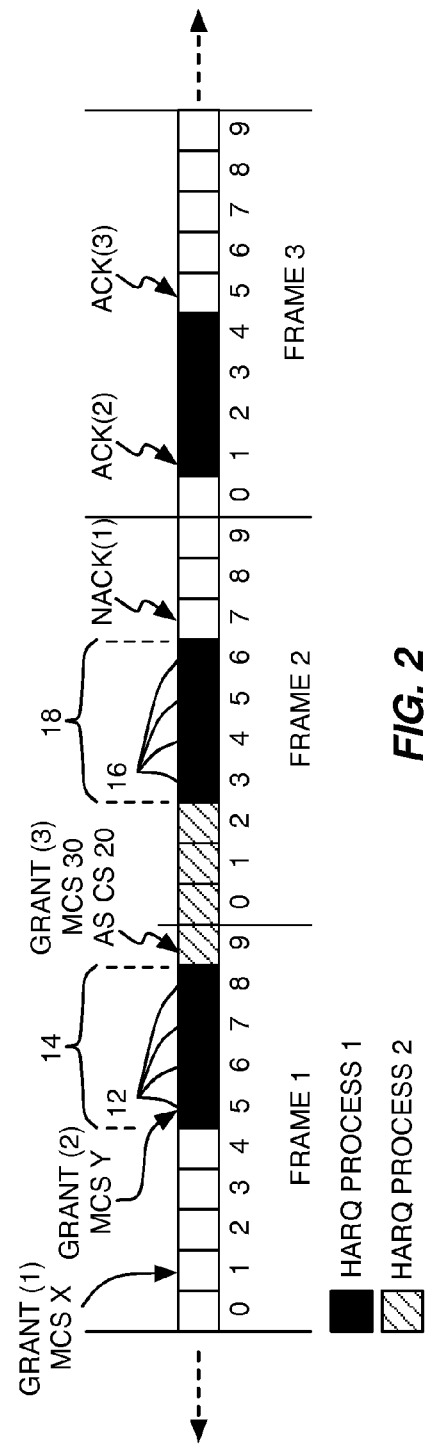

DYNAMIC BUNDLING IN LTE USING EXPLICIT SIGNALLING

RELATED APPLICATIONS

This application claims priority from the U.S. provisional patent application filed on 26 Mar. 2012 and assigned Application No. 61/615,607.

TECHNICAL FIELD

The present invention generally relates to wireless communication networks and particularly relates to networks that use dynamic bundling of Transmission Time Intervals, "TTIs".

BACKGROUND

Coverage is one of the primary requirements for cellular radio communication systems. The service coverage provided by a cellular network sets the limit on how sparsely the network can be deployed and hence has a direct impact on deployment cost.

Coverage therefore is one of the key design parameters in the Long Term Evolution, "LTE", standard defined by the Third Generation Partnership Project, "3GPP", Technical Specifications. One of the important services that an LTE network should be able to provide is voice service. Voice services are typically equal rate in both uplink and downlink. Coverage is generally limited by the uplink, because of the power limitations in mobile devices. Particularly with the short Transmission Time Intervals, "TTIs", used in LTE, a User Equipment, "UE", or other wireless device having limited power and operating at a cell border, for example, may not be able to transmit even a small Voice-over-IP, "VoIP", packet in one TTI with sufficient energy to insure successful reception at a certain probability. Such conditions make multiple Hybrid Automatic Repeat reQuest, "HARQ", retransmissions much more likely. Each such retransmission introduces an additional 8 ms delay. Many retransmissions lead to long delays, which can be intolerable in delay sensitive applications such as VoIP.

Rel. 8 of the LTE standard introduced "TTI bundling" to improve coverage of Voice over IP (VoIP). TTI bundling "bundles" four uplink transmission time intervals together, where succeeding transmission time intervals in the bundle are used for autonomous retransmissions. Correspondingly, a UE allocated bundle of TTIs transmits several redundancy versions (RVs) of the same transmission using the consecutively bundled TTIs. The network sends HARQ feedback for the bundled transmissions only when the last redundancy version is received.

Sending a bundle of transmissions using different redundancy versions increases the likelihood of successful reception and therefore reduces the likelihood of having to make one or more HARQ retransmissions. More particularly, bundling improves the likelihood of successful reception while effectively reducing the overhead of the transmissions because, rather than applying separate headers, the same header information is used in all TTIs. Channel coding efficiency also increases because of the longer code words.

The general time-structure of TTI bundling is described in FIG. 1, which illustrates transmission timing in terms of recurring frames 10, each divided into a like number of subframes 12, which are also referred to as TTIs. Note that FIG. 1 does not break out parallel timelines for downlink and uplink transmissions and subframes 12. In the diagram, a grant is sent from the network to a targeted UE or other wireless device running multiple synchronous HARQ processes. As holds in the LTE context, FIG. 1 assumes that there is a default mapping between respective HARQ processes and respective ones of the subframes 12.

Thus, the subframe 12 in which the grant is sent defines, according to the default mapping, which one of the HARQ processes the grant pertains to. Further, according to the default mapping, the transmission corresponding to the grant begins a defined number of subframes 12 after the grant. In this regard, one may view the subframe/frame timeline of FIG. 1 as illustrating a number of recurring subframes which are all mapped by default to respective ones of the involved HARQ processes. In other words, each HARQ process is associated with regularly scheduled subframes 12, according to the default mapping. To grant a transmission or retransmission to a particular one of the HARQ processes, the network sends the grant on one of the subframes 12 that by default are used to make grants to that particular HARQ process, and the network receives the transmissions or retransmissions from that particular HARQ process on the granted subframes 12, which are also known a priori according to the default mapping.

Thus, there is a regularly recurring association between subframes 12 or TTIs and HARQ processes, where that association repeats for each cycling of the multiple synchronous HARQ processes running between the network and the UE. In the Frequency Division Duplex, "FDD", context, there are four HARQ processes running synchronously. Further, with TTI bundling, bundles 14 of consecutive subframes 12 are granted, again according to the default mapping between subframes and HARQ processes. According to this default mapping, a scheduling grant is sent to a UE 4 ms before the start of a corresponding TTI bundle 14. The UE then transmits one transport block over the four subframes of that TTI bundle 14, using one redundancy version per subframe. The UE then expects HARQ feedback from the network 16 ms after the initial grant. If negative feedback is received, a non-adaptive retransmission is performed by the UE 4 ms after the feedback.

While TTI bundling efficiently improves coverage for coverage-limited VoIP services, the standardized approach to TTI bundling has several drawbacks. At least some of these drawbacks are identified in the document, R1-120900, "Way Forward on Uplink Coverage Enhancement", RAN 1#68 Dresden February 2012.

One noted drawback of TTI bundling is that the most commonly used VoIP codecs generate one new data frame every 20 ms. These data frames should be conveyed to the receiver with the lowest possible latency. A common requirement is to put a limit of 50 ms on the uplink physical layer delay. With this delay requirement and the 16 ms round trip time applicable in LTE with TTI bundling, segmentation and separate transmission of coding and overhead are needed to make full use of the UE transmit power. However, the resulting larger packet overhead and lower coding gain reduces coverage as compared to what would be achieved if the 20 ms frames could be sent in single transport blocks.

SUMMARY

The teachings herein disclose methods and apparatuses for dynamically rescheduling retransmissions from a selected Hybrid Automatic Repeat reQuest, "HARQ", process, based on temporarily remapping the selected HARQ process to one or more subframes that are by default scheduled for another HARQ process running synchronously with the first HARQ process. One advantage of dynamic rescheduling is that a retransmission for a given HARQ process can be accelerated in time, as compared to when the retransmission would occur absent the remapping. In another advantageous aspect, the control signalling for dynamic rescheduling may be included in the Downlink Control Information, "DCI", used to send scheduling grants for the HARQ processes, such that dynamic rescheduling uses control signalling that is compatible with existing scheduling grant signalling.

In an example embodiment, a base station is configured for operation in a wireless communication network that provides communication services to a wireless device supporting multiple HARQ processes. Each HARQ process has its own scheduled subframes according to a default mapping of respective HARQ processes to respective subframes. The base station includes a wireless communication interface configured to transmit downlink signals to wireless devices and to receive uplink signals from such wireless devices, and further includes one or more processing circuits operatively associated with the wireless communication interface. The one or more processing circuits are configured to decide to dynamically reschedule a retransmission from a first one of the HARQ processes, and to dynamically reschedule the retransmission from the first HARQ process by sending control signalling to the wireless device.

The control signalling temporarily remaps one or more scheduled subframes from a remaining one of the HARQ processes to the first HARQ process as "rescheduled" subframes to be used by the first HARQ process for the retransmission. Here, "rescheduled" connotes subframes that would normally be reserved for use by another one of the HARQ processes according to the default mapping, and which are temporarily remapped to the first HARQ process. Notably, the "first" HARQ process is any dynamically selected one of the available HARQ processes, and it is to be understood that different ones of the HARQ processes may be selected as the "first" HARQ process at different times. Further, the HARQ process from which the scheduled subframes are taken for remapping to the first HARQ process may change at each instance of dynamic rescheduling.

In any case, the one or more processing circuits of the base station are configured to receive the retransmission from the wireless device in the one or more rescheduled subframes. Further, the one or more processing circuits of the base station are correspondingly configured to process the retransmission as part of the first HARQ process, e.g., through appropriate redundancy version combining with any associated earlier transmissions or retransmissions. Thus, "processing" the retransmission will be understood as processing the received retransmission signal at the base station.

In a corresponding example, a wireless device, such as a User Equipment or UE, is configured to support multiple HARQ processes for communication with a wireless communication network, where each HARQ process has its own scheduled subframes according to a default mapping of respective HARQ processes to respective subframes. The example wireless device includes a wireless communication interface configured to receive downlink signals from the wireless communication network, and to send uplink signals to the wireless communication network. Further, the wireless device includes one or more processing circuits that are operatively associated with the wireless communication interface and configured to receive control signalling from the wireless communication network that indicates a dynamic rescheduling of a first one of the HARQ processes.

In more detail, the one or more processing circuits of the example wireless device are configured to determine from the control signalling a temporary remapping of one or more scheduled subframes from a remaining one of the HARQ processes to the first HARQ process. The scheduled subframes, which are remapped to the first HARQ process, are referred to as "rescheduled" subframes to be used by the first HARQ process for the retransmission, and the one or more processing circuits of the example wireless device are configured to send the retransmission for the first HARQ process on the rescheduled subframes.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a diagram of TTI bundling, as is known from Rel. 8 of the LTE specification.

FIG. 2 is a diagram of one method of dynamic retransmission scheduling, according to an embodiment of the present invention.

DETAILED DESCRIPTION

Figure 3:
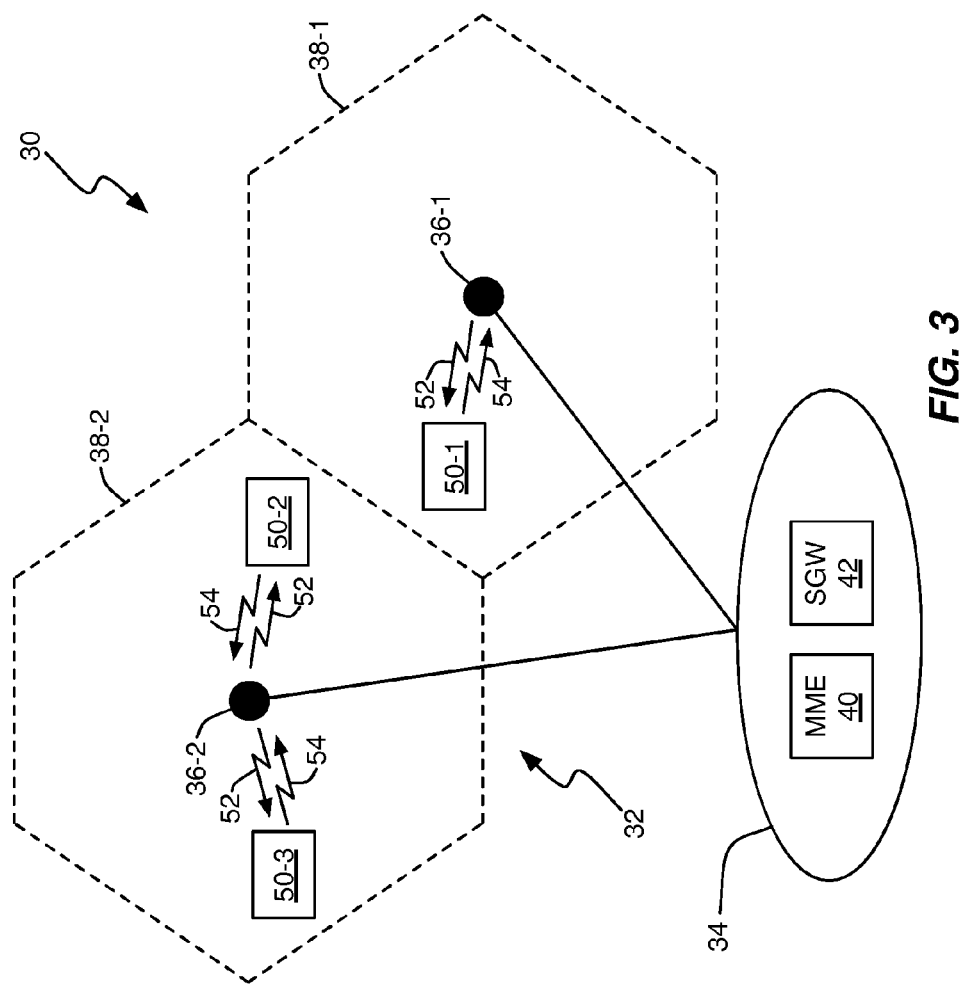
FIG. 3 is a diagram of an example wireless communication network.

This detailed description introduces and explains a number of non-limiting embodiments as working examples. The various embodiments may be used to map any Hybrid Automatic Repeat reQuest, "HARQ", process, but it is also contemplated to restrict the mapping by indicating only a subset of the available HARQ processes. In either case, it is contemplated herein to send control signalling from a base station or other network node to a wireless device, wherein the control signalling dynamically reschedules a selected one of multiple HARQ processes supported by the wireless device, referred to as a "first" one of the HARQ processes for convenience, based on temporarily remapping to the first HARQ process one or more subframes that are by default scheduled for a remaining one of the HARQ processes. The remapped subframes are referred to as "rescheduled subframes", to denote that their usage is a temporary deviation from the default mapping of subframes to respective ones of the HARQ processes.

The terms "base station" and "wireless device" are broadly understood to encompass a range of equipment and/or device types. For example, the wireless device comprises a cellular radiotelephone or smart phone, cellular modem or network adaptor, a laptop or other computer with wireless communication capability, or other such communication device. In a Long Term Evolution or LTE context, the wireless device may be referred to as a User Equipment or UE, and the base station may be referred to as an eNodeB or eNB.

Continuing with an example set in the LTE context, the control signalling used for HARQ process remapping is based on the Redundancy Version Indicator, "RVI", and New Data Indicator, "NDI", included in the Downlink Control Information, "DCI", used for sending scheduling grants from a supporting base station to a wireless device. One embodiment uses the existing DCI format 0, as specified in 3GPP TS 36.212 v10.5.0, and in particular reuses the RVI and NDI fields to carry the control signalling used to indicate a temporary remapping of subframes.

DCI format 0 contains 5 bits indicating the Modulation and Coding Scheme, "MCS", and redundancy version. These bits represent a set of binary values or code-points, with the standard meaning of each code-point specified in Table 8.6.1-1 in TS 36.213 v10.3.0. As can be seen in the table, the last 3 code-points are only used as the RVI for retransmissions. These code points can only be used for retransmissions because Transport block size and modulation format are not associated with them.

The NDI is toggled with respect to the last scheduled transmission of a HARQ process, to indicate whether a transmission is associated with new data or is a retransmission.

For TTI bundling in Frequency Division Duplex, "FDD", operation of LTE, there are in total four HARQ processes. Each subframe is associated with one process, i.e., the process to use is determined by the transmission time.

In this context, in one embodiment of signalling a temporary remapping of subframes for dynamic rescheduling of a retransmission, the last three code points, bits 29-31, of the RVI are used to indicate a delta offset to the process mapping together with the NDI. This can be done in a number of ways: the code-points 29 to 31 represent the remapping as a delta offset. For the FDD case, example delta offsets are 4, 8, or 12 ms, where the offset is taken relative to the scheduled subframes corresponding to a scheduling grant represented by the DCI. For the Time Division Duplex or TDD case in LTE, the scheduling timing offset is dependent on the subframe, and example delta offsets are 5, 10, and 15 ms. In an equivalent arrangement, it may be pre-agreed that the offset is taken relative to the subframe in which the remapping scheduling grant is sent.

Using the 4, 8, and 12 ms offsets by way of example, in one embodiment, the code-points 29 to 31 represent the remapping as a delta offset of 4, 8, or 12 ms, if the NDI of the current process has been toggled. Additionally, or alternatively, the code-points 29 to 31 represent the remapping as a delta offset of 4, 8, or 12 ms, if the NDI of the HARQ process being remapped is the same as the NDI signalled in the grant.

One example of this embodiment is illustrated in FIG. 2. In the figure, one sees a selected time frame spanning a number of recurring frames 10, labelled as "FRAME 1", "FRAME 2" and "FRAME 3" by way of non-limiting example. As in FIG. 1, each frame 10 includes a like number of subframes 12, which are bundled into bundles 14 of four subframes 12 or TTIs. As will be explained below, one also sees rescheduled subframes 16, comprising a rescheduled bundle 18. The rescheduled subframes 16 can be understood as subframes 12 that would normally be scheduled for a given one of the HARQ processes according to the default mapping between respective HARQ processes and respective subframes 12, but which are temporarily rescheduled for use by another one of the HARQ processes according to the teachings herein. FIG. 2 also assumes four HARQ processes running synchronously between a wireless communication network and a targeted wireless device, with these processes referred to as HARQ process 1, HARQ process 2, and so on.

With the above explanation in mind, one sees a scheduling grant, "GRANT (1)", for new data in subframe (SF) 1 in frame (F) 1, corresponding to a data transmission starting in SF5 mapping to HARQ process 1. GRANT (1) as sent in "SF1F1", which denotes subframe 1 of frame 1, will be understood to be an uplink grant sent from a base station to the wireless device. According to the default 4 ms delay, GRANT (1) grants SF5S1-SF8S1 to the HARQ process for which GRANT (1) was sent. Here, the default mapping maps grants sent in SF1F1 to HARQ process 1, meaning that GRANT (1) is known to be a grant for HARQ process 1. Also note that GRANT (1) is sent with an MCS value of "X", which should be understood as representing a "normal" or non-reserved MCS value that is normally processed by the wireless device.

One also sees another scheduling grant, "GRANT (2)", for new data, where GRANT (2) is sent in SF5F1. According to the default mapping, GRANT (2) corresponds to a bundled data transmission starting in SF9F1 for HARQ process 2. Notably, GRANT (2) includes an MCS value of "Y", which may be the same as the value of "X" sent in GRANT (1), and which in any case is to be understood as a normal, non-reserved value for the MCS, to be processed normally by the wireless device.

Now, in SF9F1, one sees a scheduling grant, "GRANT (3)", which is sent in SF9F1. This grant, according to the default mapping, would normally be associated with HARQ process 3, which would begin its corresponding transmission 4 ms later, in SF3F2-SF6F2. However, GRANT (3) includes control signalling 20, abbreviated as "CS 20" in the diagram that indicates a dynamic rescheduling of a retransmission from another one of the HARQ processes, according to the teachings herein. In this specific but non-limiting example, the control signalling 20 comprises a reserved MCS value, shown here as MCS=30, which is reserved for indicating dynamic rescheduling.

By way of example, the reserved MCS value indicates a relative offset in terms of milliseconds or, more generally, TTIs or subframes 12. It may be preconfigured that the offset is taken from the subframe 12 in which the grant is sent or, equivalently, it may be preconfigured that the offset is taken from the scheduled subframes 12 corresponding to the grant. Of course, the offset value would be set according to the manner in which the offset was used. In either case, by sending different reserved MCS values, the network can indicate different offsets, with each offset representing a different remapping. Thus, by dynamically choosing for which HARQ process to send a modified grant—i.e., one carrying the control signalling 20—the network selects which HARQ process will forfeit its normally scheduled subframes 12 for use in the dynamic rescheduling. Further, by dynamically choosing the value of the offset indicated in the modified grant, the network selects which HARQ process is remapped to the subframes 12 of the forfeiting HARQ process.

In an example case, the reserved value of MCS=30 represents an offset value of eight. Assuming TTI bundling, according to the default mapping, GRANT(3) as sent at SF9F1 grants to HARQ process 3 a bundle 14 of four subframes 12, beginning 4 ms after SF9F1—i.e., subframes SF3F2 through SF6F2. However, with the reserved MCS value of 30 included in GRANT(3), the wireless device interprets GRANT(3) as indicating a dynamic rescheduling and identifies the HARQ process being dynamically rescheduled by applying the offset relative to the beginning of the granted bundle 14, i.e., SF3F2−8=SF5F1. According to the known, default mapping, SF5F1 is associated with HARQ process 1.

Therefore, the offset indicated in GRANT(3) is understood by the wireless device to point to another subframe 12, and the default mapping between respective HARQ processes the pointed-to subframe identifies the HARQ process to be remapped to the subframes 12 associated with GRANT(3).

Therefore, rather than transmitting for HARQ process 3 on SF3F2-SF6F2, the wireless device performs a retransmission for HARQ process 1 on those subframes 12. It will be understood that indicating a different offset via the control signalling 20 would result in a different HARQ process being remapped to SF3F2-SF6F2, and that sending the "modified" grant in a subframe 12 reserved by the default mapping for making grants to another one of the HARQ processes would change which HARQ process temporarily forfeits its scheduled subframes 12 for use in remapping.

Also, in the example of FIG. 2, one HARQ feedback is sent per bundled transmission; in one or more other embodiments, HARQ feedback is sent only if retransmissions have not been dynamically scheduled for the associated process. Further, any of the alternatives for using MCS to indicate dynamic rescheduling may be combined with limitations in the resource allocation. For example, the dynamic rescheduling taught herein may be restricted to cases where the resource allocation size is the same as the previous allocation size of either the current process or the process mapped to using the delta offset.

As an alternative or complement to code-point 29-31, code points 21 and 11 in the MCS table can be used, because the modulation for TTI bundling is set to Quadrature Phase Shift Keying, "QPSK", and these code points thus have the same effective meaning as code point 20 and 10.

In yet another embodiment, resource block allocation information is used for sending the control signalling 20 via DCI. In the LTE standard, the resource allocation size of TTI bundling is restricted to a maximum of three resource blocks. The number of bits in the DCI used to indicate resource allocation depends on whether or not frequency hopping is applied. Because the LTE uplink only supports continuous allocations, resource allocation is signalled as a start index and an allocation size.

This feature means that at least for most system bandwidths, there are unused code points, which may be reserved for conveying the control signalling 20. These code points thus can be reused to indicate HARQ process remapping as taught herein. One such example of remapping assumes that the resource allocation size is determined as the signalled allocation size modulo 3, and the control signalling 20 is the floor of the allocation size divided by 3. That is, the offset value used to identify the HARQ processing being remapped in a given scheduling grant is determined as the floor of the allocation size indicated in the DCI, divided by 3.

In another embodiment, the DCI includes additional bits that are explicitly included for use in conveying the control signalling 20. These additional bits are used to explicitly indicate the HARQ process being remapped, or they are used to specify a delta offset that the receiving wireless device uses to determine the HARQ process being remapped.

With the above example embodiments in mind, a non-limiting example advantage of the teachings herein is that more retransmissions for the same transport block can be supported in shorter time periods in a flexible and resource effective way, thereby improving coverage for delay sensitive services such as VoIP.

FIG. 3 illustrates an example wireless communication network 30, which may be, for example, a cellular network configuring according to the LTE specification. The network 30 includes a Radio Access Network, "RAN" 32, and an associated Core Network, "CN" 34. The RAN 32 includes one or more base stations 36, e.g., 36-1 and 36-2, each base station 36 providing service coverage over one or more corresponding cells 38, e.g., 38-1 and 38-2. The CN 34 includes or is associated with a number of entities, such as a Mobility Management Entity, "MME" 40, and a Serving Gateway, "SGW" 42. Of course, the network 30 may include many more base stations 36 and corresponding cells 38, and other entities not illustrated, such as Home Location Registers, Access/Authorization/Accounting (AAA) servers, etc.

The network 30 provides communication services to one or more UEs or other wireless devices 50, based on sending downlink signals 52 to the wireless devices 50 and receiving uplink signals 54 from them. In one or more implementations, such as in a LTE-based implementation, the downlink signals 52 include Downlink Control Information (DCI) that includes, at least sometimes and for at least one targeted wireless device 50, control signalling 20 that triggers or otherwise configures dynamic re-transmission scheduling as taught herein. Correspondingly, the uplink signals 54 from at least the targeted wireless device 50 include retransmissions sent according to the dynamic rescheduling.

Figure 4:
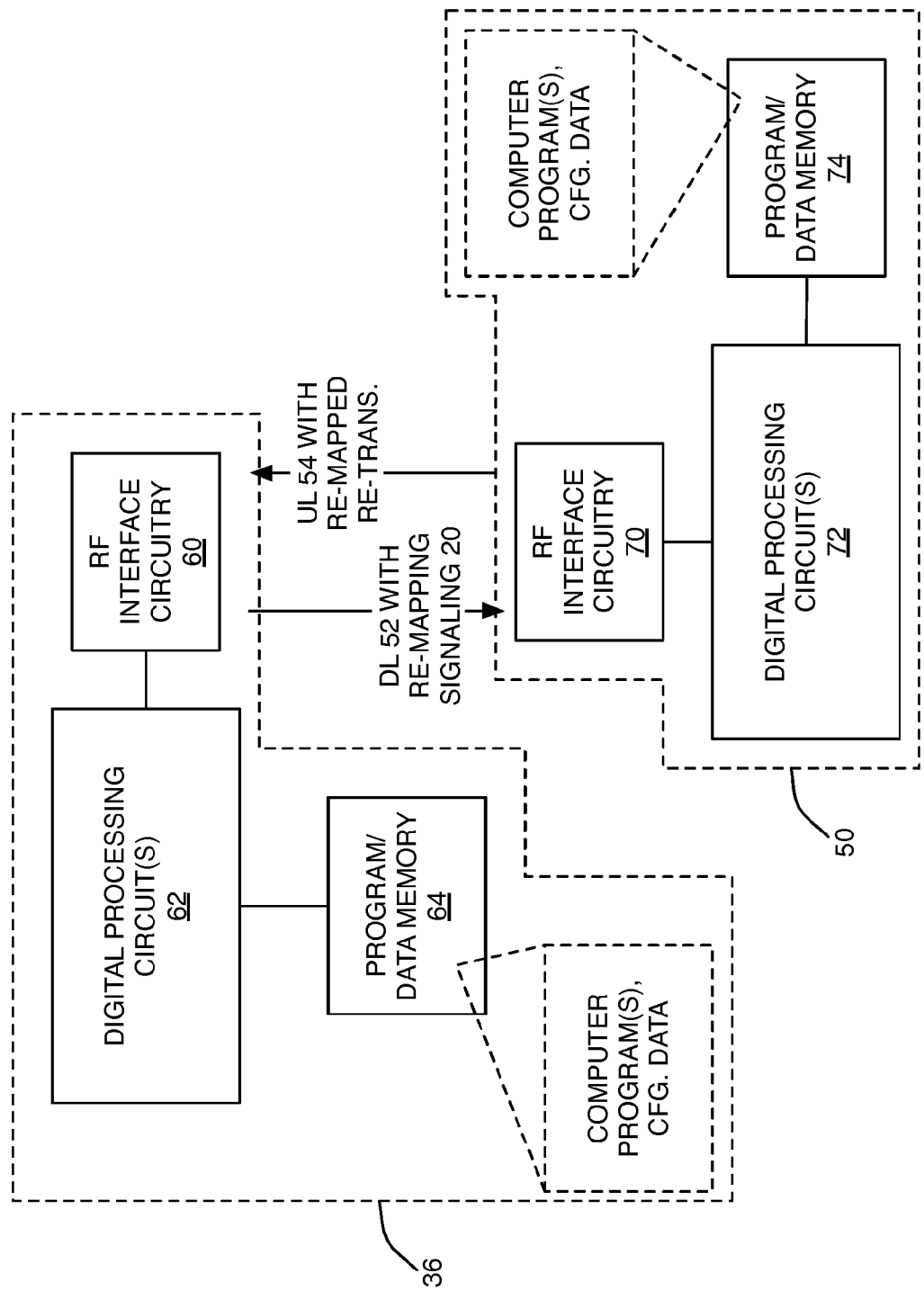
FIG. 4 is a partial block diagram of an example digital processing arrangement for a base station, e.g., an eNB in an LTE network, and a UE or other wireless device, as configured to carry out complementary network-side and device-side processing methods of the present invention.

Of course, it will be appreciated that various functional and/or physical circuit implementations may be used on the network and wireless device sides of the teachings presented herein. FIG. 4 illustrates an example embodiment of a base station 36 and a wireless device 50, where at least some of the processing associated with the teachings herein is implemented using digital processing circuitry in the base station 36 and in the wireless device 50.

For example, in FIG. 4 one sees that the base station 36 includes RF interface circuitry 60—e.g., RF circuitry for transmitting downlink signals 52 and for receiving uplink signals 54 and digital processing circuits 62 associated therewith, e.g., microprocessor and/or DSP based circuits. The DL signals 52 are shown as including control signalling 20, for remapping a HARQ process according to the teachings herein. Correspondingly, the example UL signals 54 are shown as including a rescheduled retransmission from a remapped HARQ process.

As will be understood, the base station 36 may be a complex computer or other signal processing and control apparatus, and may be configured as a chassis with one or more backplanes and racks of cards, which may be segregated by processing job or function, and FIG. 4 is not intended to exclude such arrangements. Rather, FIG. 4 merely depicts a configuration wherein one or more digital processing circuits 62 are configured to perform the dynamic retransmission scheduling through HARQ process remapping that is taught herein. As such, the program/data memory 64 or other computer-readable medium in the base station 36 include a computer program comprising program instructions, the execution of which at least partially configures the base station 36 to carry out the method(s) disclosed herein. Note that the program/data memory 64 may comprise multiple circuits and store one or multiple programs, along with configuration data, such as remapping data.

FIG. 4 also depicts the wireless device 50 as having RF interface circuitry 70 for receiving downlink signals 52 from the network 30 and for sending uplink signals 54 to the network 30, along with one or more digital processing circuits 72 and associated program/data memory 74. Albeit on a smaller and generally less complex scale, the wireless device 50, like the base station 36, may be configured to implement at least a portion of the device-side method(s) taught herein based on the execution of one or more computer programs stored in the program/data memory 74, or stored in another computer-readable medium that is accessible to the wireless device 50. Also, as shown, the memory 74 may store configuration data, including remapping data used by the wireless device 50, to determine which HARQ processes are being remapped according to received control signalling 20.

Figure 5:
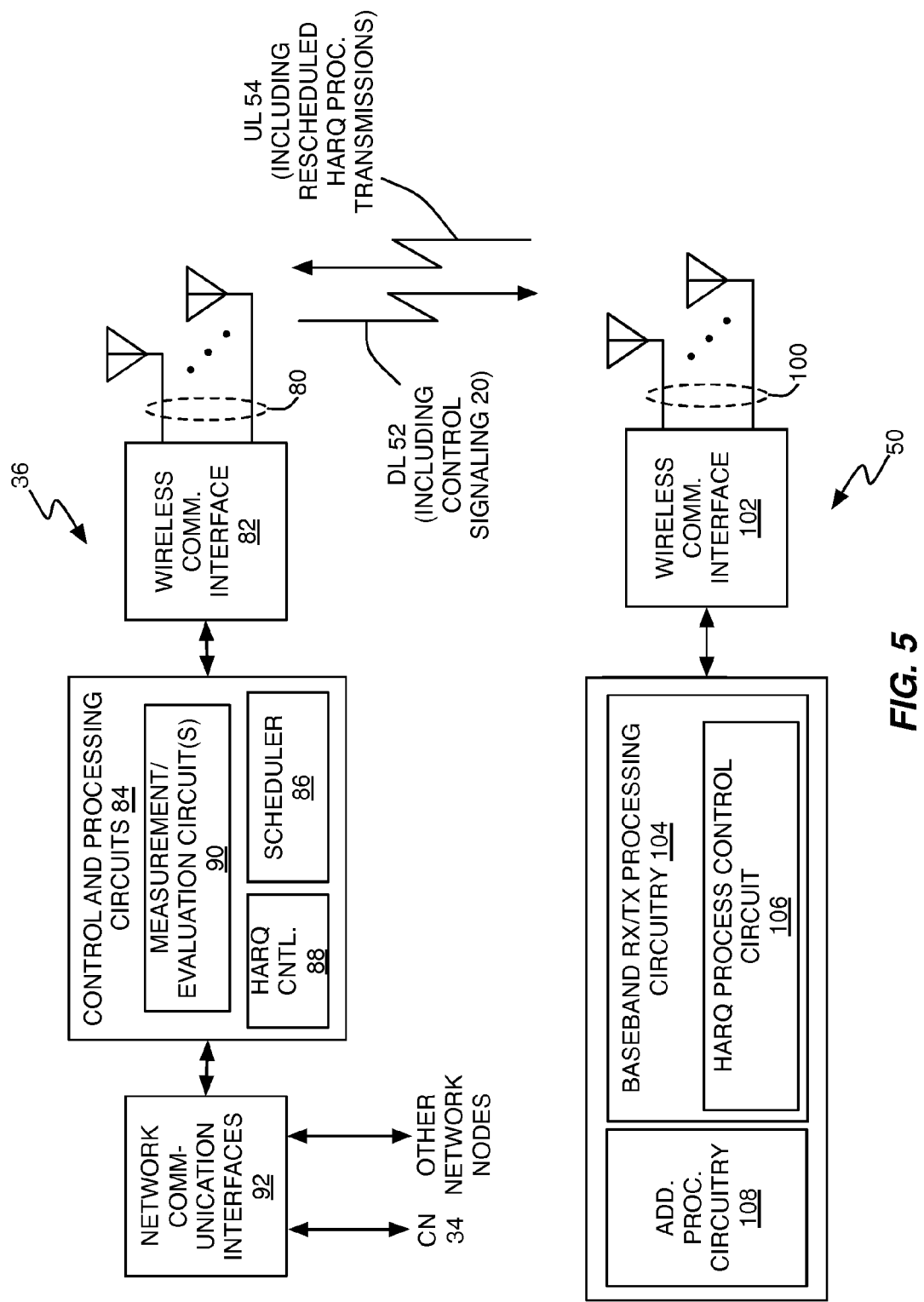
FIG. 5 is another block diagram of further example details for a base station or other network node and a wireless device.

FIG. 5 illustrates further example details for functional and/or physical circuit implementation of the base station 36 and the wireless device 50. For the base station 36, one sees that it includes one or more TX/RX antennas 80 that are associated with a wireless communication interface 82 (e.g., the RF interface circuitry 60 of FIG. 4). In turn, the wireless communication interface 82 is coupled to control and processing circuits 84, which may include or otherwise comprise the digital processing circuit(s) 62 introduced in FIG. 4. The base station 36 further includes one or more CN interfaces and/or sidehaul interfaces 92, e.g., in LTE, "X2" interfaces to another base station 36, referred to as "eNBs".

The control and processing circuits 84 include a scheduler 86, and HARQ controller 88, and various measurement and evaluation circuits 90, e.g., signal strength and/or quality, error rates, etc. The HARQ controller 88, which may be included as part of the scheduler 86, is configured to perform the dynamic re-scheduling/re-mapping at issue herein, so that a given HARQ process at a wireless device 50 can be remapped as taught herein.

In similar fashion, the wireless device 50 includes one or more RX/TX antennas 100, a wireless communication interface 102, baseband RX/TX processing circuitry 104, including a HARQ process control circuit 106. The wireless device 50 may also further include additional processing circuitry 108, which may include additional processing and control circuits, communication interfaces, user interfaces, etc.

The wireless communication interface 102 may be, for example, the RF interface circuitry 70 introduced in FIG. 4, and the baseband RX/TX processing circuitry 104 may be or may otherwise include the digital processing circuits 72. In any case, it will be understood that the wireless device 50 is configured to receive, interpret, recognize, or otherwise understand and respond to the control signalling 20 from the network 30 regarding the dynamic retransmission scheduling at issue herein. For example, the HARQ process control circuit 106 is configured to maintain a default subframe to HARQ process mapping, and to at least temporarily override or otherwise modify the default mapping, to perform a dynamically rescheduled retransmission.

Taking the example base station architecture of FIG. 5 for context, a base station 36 is configured for use in a wireless communication network 30 that provides communication services to a wireless device 50 supporting multiple HARQ processes, wherein each HARQ process has its own scheduled subframes 12 according to a default mapping of respective HARQ processes to respective subframes 12. The base station 36 comprises a wireless communication interface 82 that is configured to transmit downlink signals 52 to the wireless device 50 and to receive uplink signals 54 from the wireless device 50, and one or more processing circuits 84 that are operatively associated with the wireless communication interface 82.

The one or more processing circuits 84 are configured to decide to dynamically reschedule a retransmission from a first one of the HARQ processes and dynamically reschedule the retransmission from the first HARQ process by sending a DL signal 52 that includes control signalling 20 to the wireless device 50. The control signalling 20, which may be included in DCI targeted to the wireless device 50, indicates a temporary remapping of one or more scheduled subframes 12 from a remaining one of the HARQ processes to the first HARQ process as rescheduled subframes 16 to be used by the first HARQ process for the retransmission. The one or more processing circuits 84 are further configured to receive the retransmission from the wireless device 50 in the one or more rescheduled subframes 16, and to process the retransmission as part of the first HARQ process.

Further, in some embodiments, the processing circuit(s) 84 are configured to decide to dynamically reschedule the retransmission from the first HARQ process based on a received signal quality of uplink transmissions from the wireless device 50, for one or more of the HARQ processes. The measurement/evaluation circuits 90 shown in FIG. 5 provide, for example, one or more measurements or other values that reflect signal quality, where such measurement or value can be used as a trigger for dynamically rescheduling a retransmission from any one or more of the HARQ processes running for the wireless device 50.

In some embodiments, the decision to dynamically reschedule a HARQ process earlier in time may be based on statistics of decoded earlier transmissions within a time delay budget. In the same or other embodiments, the decision may also consider the resource availability in the cell, such as measured in the number of available resources on the downlink control channel or the uplink data channel, for example.

In the same or other embodiments, the one or more processing circuits 84 are configured to dynamically reschedule the retransmission from the first HARQ process by accelerating the retransmission in time, based on choosing the one or more rescheduled subframes 16 to occur earlier in time than any next scheduled subframes 12 for the first HARQ process according to the default mapping.

In the same or other embodiments, TTI bundling is used, wherein bundles 14 of consecutive subframes 12 are scheduled for respective ones among the multiple HARQ processes according to the default mapping. Here, the one or more processing circuits 84 are configured to dynamically reschedule the retransmission from the first HARQ process by remapping one or more the bundles 14 of consecutive subframes 12 that are scheduled for one of the remaining HARQ processes, for use by the first HARQ process for the retransmission. The bundle 14 of subframes 12 to which the first HARQ process is temporarily remapped according to the control signalling 20 is considered to be a rescheduled bundle 18 comprising rescheduled subframes 16.

In the same or other embodiments, the one or more processing circuits 84 are configured to process the retransmission as part of the first HARQ process, based on processing the retransmission in conjunction with any associated prior transmissions or retransmissions, as received from the wireless device 50 for the first HARQ process. Such processing comprises, for example, soft combining of the related transmissions and retransmissions, according to their respective redundancy versions.

In the same or other embodiments, the one or more processing circuits 84 are configured to send the control signalling 20 to the wireless device 50 by sending a scheduling grant to the wireless device 50 in a scheduled subframe 12 of one of the remaining HARQ processes, wherein the scheduling grant includes the control signalling 20 indicating the remapping in terms of subframe offsets relative to the subframe(s) 12 granted by the grant. For example, the processing circuit(s) 84 are configured to send the control signalling 20 by sending DCI to the wireless device 50 that includes a binary value reserved for indicating HARQ process remappings. In some such embodiments, the binary value or code point corresponds to a set of bits in the DCI used for indicating a Modulation and Coding Scheme, "MCS", to the wireless device 50, where the different code points correspond to the set of MCS bits corresponding to different subframe shifts, each subframe shift corresponding to a different one of the remaining HARQ processes and thereby representing a different possible remapping.

In a further example related to the use of DCI, the one or more processing circuits 84 of the example base station 36 are configured to send the control signalling 20 as one of the following: DCI that includes reserved values for the RVI and NDI, where the reserved values of RVI and NDI are reserved for indicating different ones among a number of defined HARQ process remappings; DCI that includes a reserved value for a Resource Block Allocation Indicator, wherein the reserved values for the Resource Block Allocation Indicator are reserved for indicating different ones among a number of defined HARQ process remappings; or DCI that includes one or more dedicated indicators used for indicating different ones among a number of defined HARQ process remappings.

Of course, the dynamic rescheduling taught herein is not limited to implementation within the base station illustrated in FIG. 5, or to the example of FIG. 4. Broadly, it is contemplated herein to implement a method at a base station or other network node in a wireless communication network of dynamically scheduling a retransmission by a first HARQ process in a wireless device 50 that has multiple HARQ processes available. There is a default mapping between respective subframes 12 scheduled for new data transmissions and respective ones of the HARQ processes and the method provides a mechanism whereby the retransmission from one such HARQ process for example can be accelerated—moved up in time—by remapping the association between subframes and HARQ processes.

Figure 6:
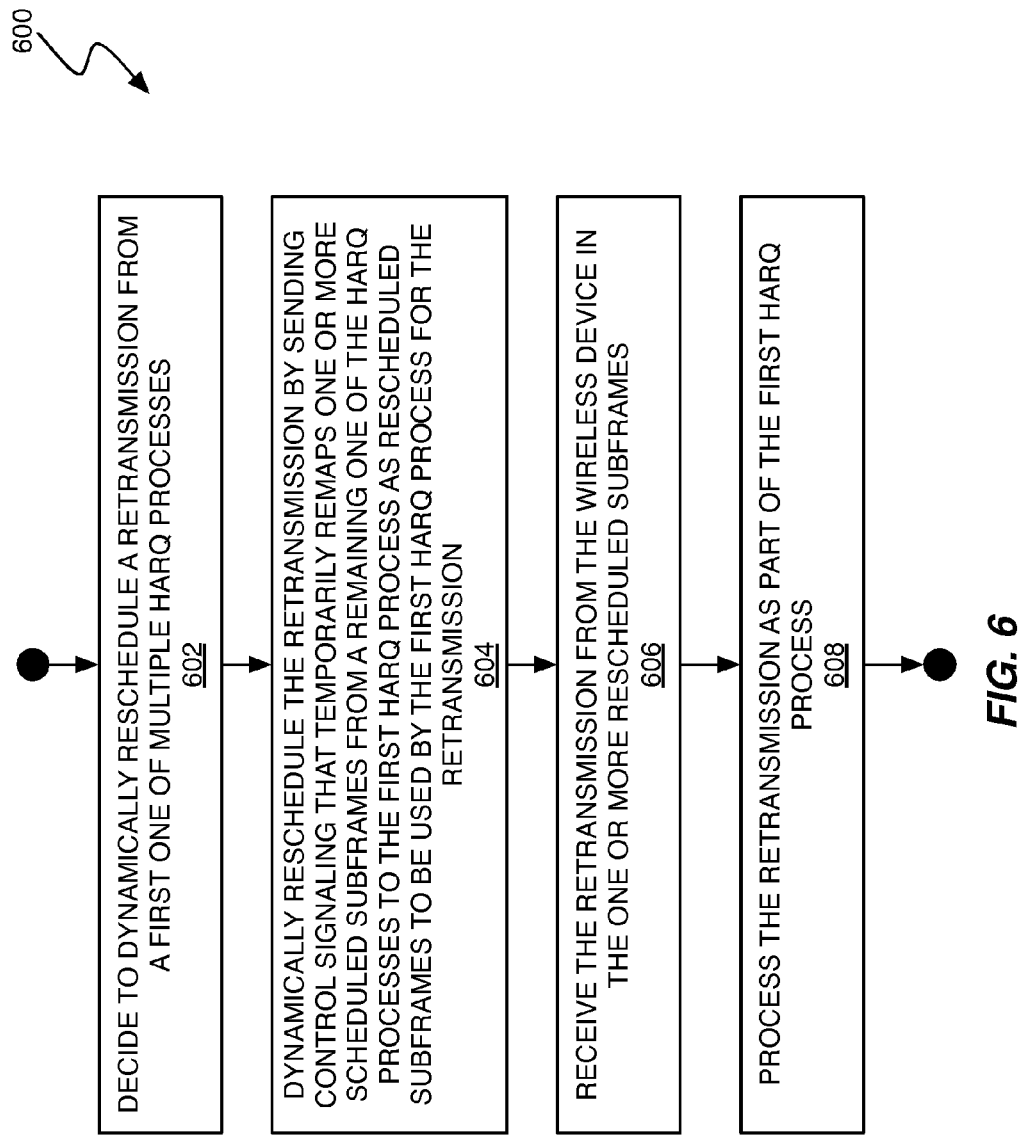
FIG. 6 is a logic flow diagram of one embodiment of a network-side method of dynamic rescheduling as taught herein, such as carried out at a base station or other network node.

FIG. 6 illustrates an example method 600 performed at a base station 36 or other network node with respect to a targeted wireless device 50. The method 600 includes deciding to dynamically reschedule a retransmission from a first one of the HARQ processes (Block 602), and, correspondingly, dynamically rescheduling the retransmission from the first HARQ process by sending control signalling 20 to the wireless device 50 that temporarily remaps one or more scheduled subframes 12 from a remaining one of the HARQ processes to the first HARQ process as rescheduled subframes 16 to be used by the first HARQ process for the retransmission (Block 604). The method 600 further includes receiving the retransmission from the wireless device 50 in the one or more rescheduled subframes 16 (Block 606), and processing the retransmission as part of the first HARQ process (Block 608).

As explained previously, sending the control signalling 20 to the wireless device 50 at least temporarily overrides the default mapping between the respective subframes 12 and the respective HARQ processes by at least temporarily remapping the first HARQ process to the subframe(s) of another HARQ process. As a consequence of the remapping, the base station 36 or other network node receives the retransmission from the first HARQ process at a retransmission time of the HARQ process whose subframes 12 were remapped to the first HARQ process.

Further, as noted in earlier examples, the control signalling 20, for example, is sent in DCI by reusing bits in one or more existing DCI formats, or by adding new bits to one or more existing DCI formats, or by using one or more new DCI formats that provide for such signalling. Further, in at least one embodiment of the above method, the retransmission is for a bundled TTI transmission by the wireless device 50. In this context, an example embodiment of the method 600 includes scheduling a retransmission for a pending HARQ process at the wireless device 50 by sending a scheduling grant on a downlink subframe 12 that includes control signalling 20 that re-maps a subsequent subframe 12 from its default HARQ process to the pending HARQ process, and correspondingly receiving the dynamically scheduled retransmission on an uplink subframe corresponding to the re-mapping.

Turning to corresponding example details on the device side, a wireless device 50 is configured to support multiple HARQ processes for communication with a wireless communication network 30, where each HARQ process has its own scheduled subframes 12 according to a default mapping of respective HARQ processes to respective subframes 12. Referring to the details illustrated in FIG. 5 as a non-limiting example, the wireless device 50 comprises a wireless communication interface 102 that is configured to receive downlink signals 52, including control signalling 20, from the wireless communication network 30, and to send uplink signals 54 to the wireless communication network 30.

The wireless device 50 further includes one or more processing circuits 104 that are operatively associated with the wireless communication interface 102 and configured to: receive control signalling 20 from the wireless communication network 30 that indicates a dynamic rescheduling of a first one of the HARQ processes; determine from the control signalling 20 a temporary remapping of one or more scheduled subframes 12 from a remaining one of the HARQ processes to the first HARQ process as rescheduled subframes 16 to be used by the first HARQ process for the retransmission; and to send the retransmission for the first HARQ process on the rescheduled subframes 16.

In some embodiments, the one or more processing circuits 104 are configured to receive the control signalling 20 in a scheduling grant sent from the wireless communication network 30, and to determine from the control signalling 20 an offset in terms of subframes 12 relative to the subframe(s) 12 scheduled for the grant, wherein the offset represents the temporary remapping of the first HARQ process.

Further, in the same or other embodiments, the one or more processing circuits 104 are configured to decide whether to perform a related subsequent retransmission for the first HARQ process based on HARQ feedback from the wireless communication network 30 for one or both of: a prior related transmission or retransmission on scheduled subframes of the first HARQ process, and the dynamically rescheduled retransmission on the rescheduled subframes.

In some embodiments, the HARQ feedback related to a first transmission is dismissed if the HARQ process related to that transmission has received a dynamic rescheduling resulting in a new transmission. In other embodiments, HARQ feedback is received for both transmissions and if NACK is received, a retransmission in conducted for the HARQ process associated with the transmission to which the HARQ feedback relates. The timing of the retransmission is based on the timing of the subframe in which the feedback is received.

Still further, in the same or other embodiments, the one or more processing circuits 104 are configured to receive the control signalling 20 as one of the following: DCI that includes, as the control signalling 20, reserved values for a RVI and NDI, where the reserved values of RVI and NDI are reserved for indicating different ones among a number of defined HARQ process remappings; DCI that includes, as the control signalling 20, a reserved value for a Resource Block Allocation Indicator, where the reserved values for the Resource Block Allocation Indicator are reserved for indicating different ones among a number of defined HARQ process remappings; or DCI that includes, as the control signalling 20, one or more dedicated indicators used for indicating different ones among a number of defined HARQ process remappings.

Figure 7:
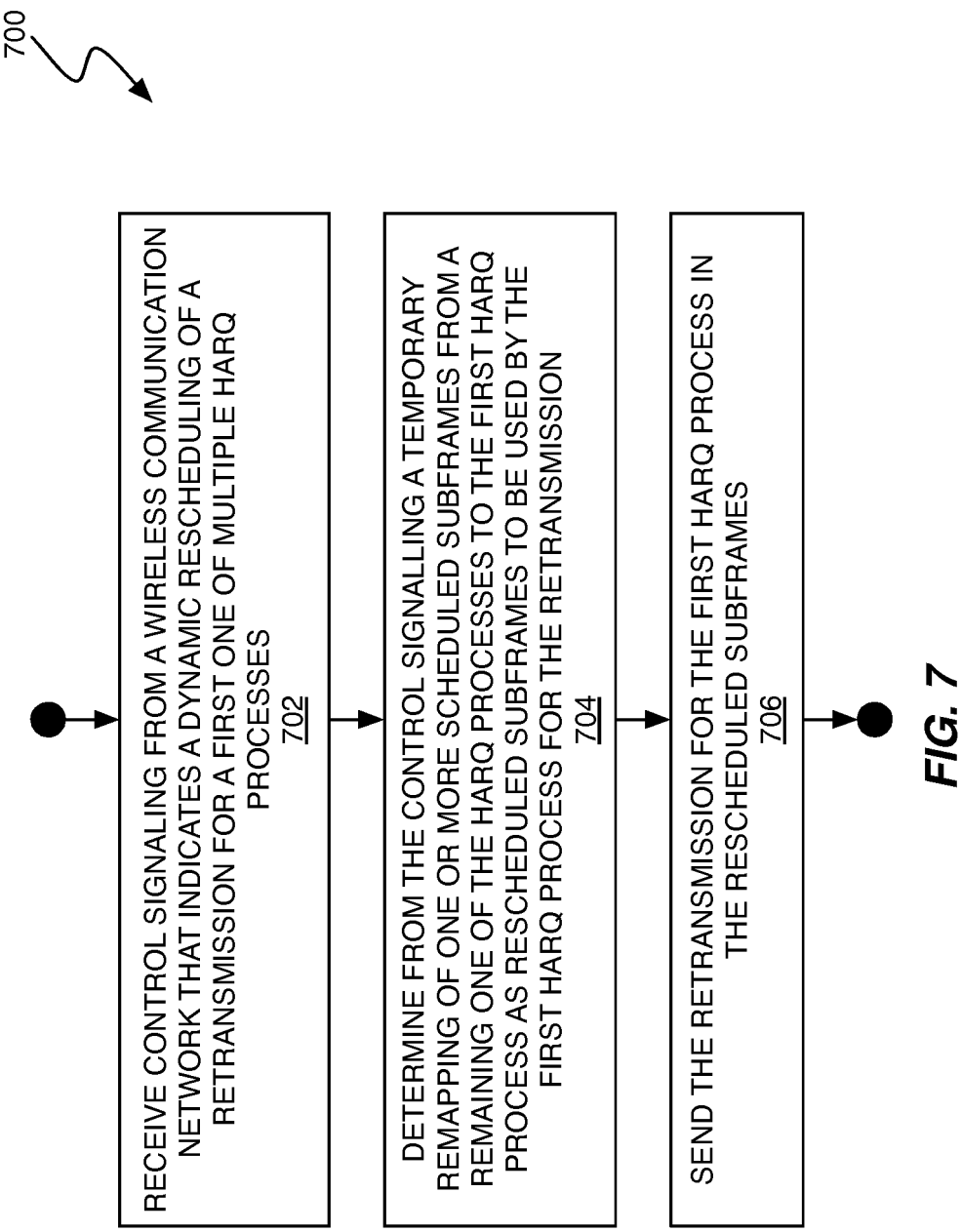
FIG. 7 is a logic flow diagram of one embodiment of a device-side method of dynamic rescheduling as taught herein, such as carried out at a User Equipment or other wireless device.

FIG. 7 illustrates a corresponding device-side method 700, which includes the wireless device 50 receiving control signalling 20 from a wireless communication network 30 that indicates a dynamic rescheduling of a retransmission for a first one of multiple HARQ processes supported by the wireless device 50 (Block 702). The method 700 further includes determining from the control signalling 20 a temporary remapping of one or more scheduled subframes 12 from a remaining one of the HARQ processes to the first HARQ process as rescheduled subframes 16 to be used by the first HARQ process for the retransmission (Block 704), and sending the retransmission for the first HARQ process on the rescheduled subframes 16 (Block 706).

In at least some embodiments, receiving the control signalling 20 from the wireless communication network 30 comprises receiving a scheduling grant from the wireless communication network 30 that includes the control signalling 20, and further wherein the scheduling grant is received on a scheduled subframe 12 of one of the remaining HARQ processes and determining the temporary remapping comprises the wireless device 50 determining from the control signalling 20 an offset in terms of subframes 12 relative to the scheduled subframe(s) 12 corresponding to the grant.

In the same or other embodiments, the method 700 includes the wireless device 50 deciding whether to perform a related subsequent retransmission for the first HARQ process based on HARQ feedback from the wireless communication network 30 for one or both of: a prior related transmission or retransmission on scheduled subframes 12 of the first HARQ process, and the dynamically rescheduled retransmission on the rescheduled subframes 16.

In the same or other embodiments, the method 700 includes receiving the control signalling 20 as one of the following: DCI that includes reserved values for the RVI and NDI, wherein the reserved values of RVI and NDI are reserved for indicating different ones among a number of defined HARQ process remappings; DCI that includes a reserved value for a Resource Block Allocation Indicator, wherein the reserved values for the Resource Block Allocation Indicator are reserved for indicating different ones among a number of defined HARQ process remappings; or DCI that includes one or more dedicated indicators used for indicating different ones among a number of defined HARQ process remappings.

Broadly, then, it is contemplated herein that a UE or other wireless device 50 receives control signalling 20 from a base station 36 or other node in a wireless communication network 20 that at least temporarily modifies the default mapping between subframes 12 and HARQ processes by remapping a first HARQ process at the wireless device 50 to a retransmission time associated by default with another HARQ process at the wireless device 50, and retransmitting data from the first HARQ at the retransmission time indicated by the remapping.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a base station in a wireless communication network that provides communication services to a wireless device supporting multiple Hybrid Automatic Repeat reQuest (HARQ) processes, wherein each HARQ process has its own scheduled subframes according to a default mapping of respective HARQ processes to respective subframes, and wherein the method comprises:
deciding to dynamically reschedule a retransmission from a first one of the HARQ processes;
dynamically rescheduling the retransmission from the first HARQ process by sending control signalling to the wireless device that temporarily remaps one or more scheduled subframes from a remaining one of the HARQ processes to the first HARQ process as rescheduled subframes to be used by the first HARQ process for the retransmission;
receiving the retransmission from the wireless device in the one or more rescheduled subframes; and
processing the retransmission as part of the first HARQ process.

2. The method of claim 1, wherein deciding to dynamically reschedule the retransmission from the first HARQ process comprises deciding to reschedule the first HARQ process based on a received signal quality of uplink transmissions from the wireless device, for one or more of the HARQ processes.

3. The method of claim 1, wherein dynamically rescheduling the retransmission from the first HARQ process comprises accelerating the retransmission in time by choosing the one or more rescheduled subframes to occur earlier in time than any next scheduled subframes for the first HARQ process according to the default mapping.

4. The method of claim 1, wherein Transmission Time Interval (TTI) bundling is used, wherein bundles of consecutive subframes are scheduled for respective ones among the multiple HARQ processes according to the default mapping, and further wherein dynamically rescheduling the retransmission from the first HARQ process comprises remapping one or more the bundles of consecutive subframes that are scheduled for one of the remaining HARQ processes, for use by the first HARQ process as a rescheduled bundle, for the retransmission.

5. The method of claim 1, wherein processing the retransmission as part of the first HARQ process comprises processing the retransmission in conjunction with any associated prior transmissions or retransmissions, as received from the wireless device for the first HARQ process.

6. The method of claim 1, wherein sending the control signalling to the wireless device comprises sending a scheduling grant to the wireless device in a scheduled subframe of one of the remaining HARQ processes, wherein the scheduling grant includes the control signalling indicating the remapping in terms of subframe offsets relative to the scheduled subframe corresponding to the scheduling grant.

7. The method of claim 1, wherein sending the control signalling comprises sending downlink control information (DCI) to the wireless device that includes a binary value reserved for indicating HARQ process remappings.

8. The method of claim 7, wherein the binary value is a code point corresponding to a set of bits in the DCI used for indicating a Modulation and Coding Scheme (MCS) to the wireless device, and wherein different code points corresponding to the set of MCS bits correspond to different subframe shifts, each subframe shift corresponding to a different one of the remaining HARQ processes and thereby representing a different possible remapping.

9. The method of claim 1, wherein sending the control signalling comprises one of the following:
sending downlink control information (DCI) that includes reserved values for a Redundancy Version Indicator (RVI) and a New Data Indicator (NDI) wherein the reserved values of RVI and NDI are reserved for indicating different ones among a number of defined HARQ process remappings;
sending DCI that includes a reserved value for a Resource Block Allocation Indicator, wherein the reserved values for the Resource Block Allocation Indicator are reserved for indicating different ones among a number of defined HARQ process remappings; or
sending DCI that includes one or more dedicated indicators used for indicating different ones among a number of defined HARQ process remappings.

10. A base station configured for use in a wireless communication network that provides communication services to a wireless device supporting multiple Hybrid Automatic Repeat reQuest (HARQ) processes, wherein each HARQ process has its own scheduled subframes according to a default mapping of respective HARQ processes to respective subframes, and wherein the base station comprises:
a wireless communication interface configured to transmit downlink signals to the wireless device and to receive uplink signals from the wireless device; and
one or more processing circuits operatively associated with the wireless communication interface and configured to:
decide to dynamically reschedule a retransmission from a first one of the HARQ processes;
dynamically reschedule the retransmission from the first HARQ process by sending control signalling to the wireless device that temporarily remaps one or more scheduled subframes from a remaining one of the HARQ processes to the first HARQ process as rescheduled subframes to be used by the first HARQ process for the retransmission;
receive the retransmission from the wireless device in the one or more rescheduled subframes; and
process the retransmission as part of the first HARQ process.

11. The base station of claim 10, wherein the one or more processing circuits are configured to decide to dynamically reschedule the retransmission from the first HARQ process based on a received signal quality of uplink transmissions from the wireless device, for one or more of the HARQ processes.

12. The base station of claim 10, wherein the one or more processing circuits are configured to dynamically reschedule the retransmission from the first HARQ process by accelerating the retransmission in time, based on choosing the one or more rescheduled subframes to occur earlier in time than any next scheduled subframes for the first HARQ process according to the default mapping.

13. The base station of claim 10, wherein Transmission Time Interval (TTI) bundling is used, wherein bundles of consecutive subframes are scheduled for respective ones among the multiple HARQ processes according to the default mapping, and further wherein the one or more processing circuits are configured to dynamically reschedule the retransmission from the first HARQ process by remapping one or more of the bundles of consecutive subframes that are scheduled for one of the remaining HARQ processes, as one or more rescheduled bundles, for use by the first HARQ process for the retransmission.

14. The base station of any claim 10, wherein the one or more processing circuits are configured to process the retransmission as part of the first HARQ process by processing the retransmission in conjunction with any associated prior transmissions or retransmissions, as received from the wireless device for the first HARQ process.

15. The base station of claim 10, wherein the one or more processing circuits are configured to send the control signalling to the wireless device by sending a scheduling grant to the wireless device in a scheduled subframe of one of the remaining HARQ processes, wherein the scheduling grant includes the control signalling indicating the remapping in terms of subframe offsets relative to the scheduled subframes corresponding to the scheduling grant.

16. The base station of claim 10, wherein the one or more processing circuits are configured to send the control signalling by sending downlink control information (DCI) to the wireless device that includes a binary value reserved for indicating HARQ process remappings.

17. The base station of claim 16, wherein the binary value is a code point corresponding to a set of bits in the DCI used for indicating a Modulation and Coding Scheme (MCS) to the wireless device, and wherein different code points corresponding to the set of MCS bits correspond to different subframe shifts, each subframe shift corresponding to a different one of the remaining HARQ processes and thereby representing a different possible remapping.

18. The base station of claim 10, wherein the one or more processing circuits are configured to send the control signalling as one of the following:
downlink control information (DCI) that includes reserved values for a Redundancy Version Indicator (RVI) and a New Data Indicator (NDI) wherein the reserved values of RVI and NDI are reserved for indicating different ones among a number of defined HARQ process remappings;
DCI that includes a reserved value for a Resource Block Allocation Indicator, wherein the reserved values for the Resource Block Allocation Indicator are reserved for indicating different ones among a number of defined HARQ process remappings; or
DCI that includes one or more dedicated indicators used for indicating different ones among a number of defined HARQ process remappings.

19. A method at a wireless device supporting multiple Hybrid Automatic Repeat reQuest (HARQ) processes for communication with a wireless communication network, wherein each HARQ process has its own scheduled subframes according to a default mapping of respective HARQ processes to respective subframes, and wherein the method comprises:
receiving control signalling from the wireless communication network that indicates a dynamic rescheduling of a retransmission for a first one of the HARQ processes;
determining from the control signalling a temporary remapping of one or more scheduled subframes from a remaining one of the HARQ processes to the first HARQ process as rescheduled subframes to be used by the first HARQ process for the retransmission;
sending the retransmission for the first HARQ process on the rescheduled subframes.

20. The method of claim 19, wherein receiving the control signalling from the wireless communication network comprises receiving a scheduling grant from the wireless communication network that includes the control signalling, and further wherein the scheduling grant is received on a scheduled subframe of one of the remaining HARQ processes and determining the temporary remapping comprises determining from the control signalling an offset in terms of subframes relative to the scheduled subframes corresponding to the scheduling grant.

21. The method of claim 19, further comprising deciding whether to perform a related subsequent retransmission for the first HARQ process based on HARQ feedback from the wireless communication network for one or both of: a prior related transmission or retransmission on scheduled subframes of the first HARQ process, and the dynamically rescheduled retransmission on the rescheduled subframes.

22. The method of claim 19, wherein receiving the control signalling comprises receiving one of the following:
   downlink control information (DCI) that includes reserved values for a Redundancy Version Indicator (RVI) and a New Data Indicator (NDI) wherein the reserved values of RVI and NDI are reserved for indicating different ones among a number of defined HARQ process remappings;
   DCI that includes a reserved value for a Resource Block Allocation Indicator, wherein the reserved values for the Resource Block Allocation Indicator are reserved for indicating different ones among a number of defined HARQ process remappings; or
   DCI that includes one or more dedicated indicators used for indicating different ones among a number of defined HARQ process remappings.

23. A wireless device configured to support multiple Hybrid Automatic Repeat reQuest (HARQ) processes for communication with a wireless communication network, wherein each HARQ process has its own scheduled subframes according to a default mapping of respective HARQ processes to respective subframes, and wherein the wireless device comprises:
   a wireless communication interface configured to receive downlink signals from the wireless communication network, and to send uplink signals to the wireless communication network; and
   one or more processing circuits operatively associated with the wireless communication interface and configured to:
      receive control signalling from the wireless communication network that indicates a dynamic rescheduling of a retransmission for a first one of the HARQ processes;
      determine from the control signalling a temporary remapping of one or more scheduled subframes from a remaining one of the HARQ processes to the first HARQ process as rescheduled subframes to be used by the first HARQ process for the retransmission;
      send the retransmission for the first HARQ process on the rescheduled subframes.

24. The wireless device of claim 23, wherein the one or more processing circuits are configured to receive the control signalling in a scheduling grant sent from the wireless communication network, and to determine from the control signalling an offset in terms of subframes relative to the scheduled subframes corresponding to the scheduling grant, wherein the offset represents the temporary remapping of the first HARQ process.

25. The wireless device of claim 23, wherein the one or more processing circuits are configured to decide whether to perform a related subsequent retransmission for the first HARQ process based on HARQ feedback from the wireless communication network for one or both of: a prior related transmission or retransmission on scheduled subframes of the first HARQ process, and the dynamically rescheduled retransmission on the rescheduled subframes.

26. The wireless device of claim 23, wherein the one or more processing circuits are configured to receive the control signalling as one of the following:
   downlink control information (DCI) that includes reserved values for a Redundancy Version Indicator (RVI) and a New Data Indicator (NDI) wherein the reserved values of RVI and NDI are reserved for indicating different ones among a number of defined HARQ process remappings;
   DCI that includes a reserved value for a Resource Block Allocation Indicator, wherein the reserved values for the Resource Block Allocation Indicator are reserved for indicating different ones among a number of defined HARQ process remappings; or
   DCI that includes one or more dedicated indicators used for indicating different ones among a number of defined HARQ process remappings.

* * * * *